(No Model.)

F. H. RICHARDS.
BUTTON FASTENER.

No. 354,585. Patented Dec. 21, 1886.

Witnesses;
C. O. Palmer.
R. L. Peck.

Inventor;
Francis H. Richards.

UNITED STATES PATENT OFFICE.

FRANCIS H. RICHARDS, OF SPRINGFIELD, MASSACHUSETTS, ASSIGNOR TO THE AMERICAN BUTTON FASTENER COMPANY, OF NEW BRITAIN, CONN.

BUTTON-FASTENER.

SPECIFICATION forming part of Letters Patent No. 354,585, dated December 21, 1886.

Application filed July 2, 1885. Serial No. 170,447. (No model.)

*To all whom it may concern:*

Be it known that I, FRANCIS H. RICHARDS, a citizen of the United States, residing at Springfield, in the county of Hampden and State of Massachusetts, have invented certain new and useful Improvements in Button-Fasteners, of which the following is a specification, reference being had to the accompanying drawings, in which—

Figure 3:
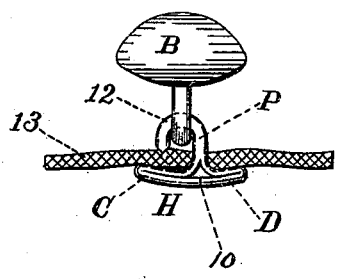
Figure 1:
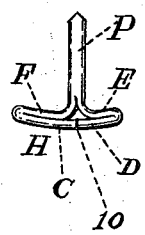
Figure 2:
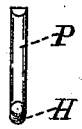
Figure 4:
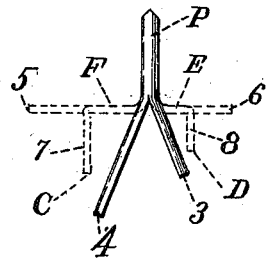

Figure 1 is a side view of a button-fastener embodying my improvements; Fig. 2, an edge view of the same; Fig. 3, a side view of the fastener set into a fabric for holding thereto a shank-button, and Fig. 4 a view illustrating the successive steps of manufacture.

Similar characters designate like parts in all the figures.

This invention relates to improvements in one-prong fasteners to be used for securing shank-buttons to fabrics, the object being to furnish such a fastener having all the necessary features, and of such a form that it can be manufactured out of wire, thereby avoiding the sharp angles and edges common to those kinds which are cut from sheet metal.

The invention consists in certain improvements which are hereinafter described and claimed.

In the drawings, P designates the prong, and H the head, of a fastener made from suitably-shaped wire.

The method of manufacture (see Fig. 4) is to first split for a sufficient distance one end of a piece of wire, P, into two parts, 3 and 4. These parts are now bent outward, as indicated by dotted lines 5 and 6, and then downward, as shown by lines 7 and 8, after which the ends C D are respectively closed onto parts F E. This completes the fastener, as shown in Fig. 1.

The fastener is readily inserted into a fabric or shoe-upper, as 13, by means of the ordinary button-fastener-setting instruments adapted to bend over the prong P to form the hook 12 through the shank of button B, as in Fig. 3. When thus set the pressure of the fabric 13 on parts F and D has a tendency to bend these parts down, which tendency is resisted by the abutting together of parts C D at 10, Figs. 1 and 3.

It will be understood that the wire from which the fasteners are made need not necessarily be round, as shown in the drawings, but may be oval or square, as may be preferred.

The method of constructing the fastener shown in the drawings I intend shall form the subject-matter of a separate application to be filed.

Having thus described my invention, I claim—

The improved button-fastener herein described, it comprising a single prong and a head standing crosswise thereto, all formed of a single piece of wire which is split through its head-forming portion, the divided parts of which portion are each bent upon itself to form a head having rounded corners, substantially as set forth.

FRANCIS H. RICHARDS.

Witnesses:
R. L. PECK,
C. O. PALMER.